US007797556B2

United States Patent
Yamamoto (10) Patent No.: US 7,797,556 B2
(45) Date of Patent: Sep. 14, 2010

(54) IMAGE FORMING APPARATUS ALLOWING SETTING ITEM TO BE CHANGED IN POWER-SAVING MODE

(75) Inventor: Hirokazu Yamamoto, Chuo-ku (JP)

(73) Assignee: Kyocera Mita Corporation, Osaka (JP)

( * ) Notice: Subject to any disclaimer, the term of this patent is extended or adjusted under 35 U.S.C. 154(b) by 761 days.

(21) Appl. No.: 11/711,590

(22) Filed: Feb. 26, 2007

(65) Prior Publication Data

US 2007/0201089 A1    Aug. 30, 2007

(30) Foreign Application Priority Data

Feb. 27, 2006 (JP) .............................. 2006-049883
Jul. 12, 2006 (JP) .............................. 2006-191542
Jan. 12, 2007 (JP) .............................. 2007-004658

(51) Int. Cl.
*G06F 1/00* (2006.01)
*G06F 1/32* (2006.01)
*G06F 3/00* (2006.01)

(52) U.S. Cl. .................. 713/300; 713/320; 713/322; 710/5; 709/223

(58) Field of Classification Search ................. 713/300, 713/320, 322; 710/5; 709/223
See application file for complete search history.

(56) References Cited

U.S. PATENT DOCUMENTS

| | | | | |
|---|---|---|---|---|
| 6,658,576 | B1 * | 12/2003 | Lee | 713/320 |
| 7,370,217 | B2 * | 5/2008 | Weast | 713/320 |
| 7,474,431 | B2 * | 1/2009 | Yamano et al. | 358/1.15 |
| 2002/0144023 | A1 * | 10/2002 | Kawabuchi et al. | 710/5 |
| 2003/0114205 | A1 * | 6/2003 | Yamashita | 455/574 |
| 2005/0021728 | A1 * | 1/2005 | Sugimoto | 709/223 |
| 2006/0128348 | A1 * | 6/2006 | Jang | 455/343.1 |

FOREIGN PATENT DOCUMENTS

| | | |
|---|---|---|
| JP | 2002-099399 | 4/2002 |
| JP | 2005-094679 | 4/2005 |

* cited by examiner

Primary Examiner—Vincent T Tran
(74) Attorney, Agent, or Firm—Jordan and Hamburg LLP (57) ABSTRACT

An image forming apparatus includes a printing unit capable of printing, the printing unit being in a suspended state with power supply being cut off in power-saving mode, and being in a wait state with power being supplied thereto in normal mode; an information storage unit capable of writing and retaining setting information of the printing unit at the time of power supply, the information storage unit being in a suspended state with power supply being cut off in power-saving mode; and a signal control unit that controls power supply to the information storage unit in power-saving mode with a signal transmitted and received by an interface unit from an external terminal device.

14 Claims, 8 Drawing Sheets

IMAGE FORMING APPARATUS ALLOWING SETTING ITEM TO BE CHANGED IN POWER-SAVING MODE

BACKGROUND OF THE INVENTION

1. Field of the Invention

The present invention relates to a technology allowing a setting item of an image forming apparatus to be changed even in power-saving mode.

2. Background Technology

In order to suppress power consumption, an output apparatus, such as an image forming apparatus, on a network enters power-saving mode in which power supply to a portion that consumes large power, such as a printing unit, is cut off. However, in power-saving mode, no reply can be made to a response from the network to the output apparatus about a setting state. Therefore, in order to check the setting state of the output apparatus, it is required to transmit a packet for making a transition from power-saving mode to normal mode from a terminal device through the network to make a transition from power-saving mode to normal mode, and then check the setting state.

However, returning to normal mode only for the purpose of checking the setting state poses some problems, such as requiring large power consumption and too long time for mode transition.

To solve these problems, in a method, a status register independently of the CPU of the output apparatus is provided and, at the time of making an inquiry about the setting state from the terminal device to the output apparatus in power-saving mode through the network, status information stored in the status register is sent back (Japanese Patent Laid-Open Publication No. 2002-99399).

However, in this method, the amount of information with which the output apparatus can respond is extremely small from several bits to several tens of bits storable in the status register. Moreover, although reading the setting information of the output apparatus (responding to an inquiry) is possible, writing (changing the setting information) is impossible.

In another method, an image processing apparatus is provided with a first ASIC (Application Specific Integrated Circuit) operating in conjunction with the CPU and a second ASIC that can respond, in conjunction with a network interface, to a signal from a terminal device for requesting a change of power-saving mode of the image processing apparatus, and a startup request signal is transmitted from the terminal device to the second ASIC to start up the first ASIC and the CPU (Japanese Patent Laid-Open Publication No. 2005-94679).

However, this method is merely a way of starting up the CPU and, a transition to normal mode is still required in order to read and write the setting state of the image processing apparatus.

Therefore, when the setting information, such as user account information, of the image forming apparatus is desired to be changed on the image forming apparatus, it is required to write the setting information of the image forming apparatus. This operation does not require power supply to a printing unit, which consumes power most in the image forming apparatus, and can be performed in power-saving mode, which however cannot be achieved in the conventional technology.

SUMMARY OF THE INVENTION

An object of the present invention is to allow a setting item of an image forming apparatus to be changed even in power-saving mode.

In the conventional technology, when the image forming apparatus is in power-saving mode, no setting item can be written.

In the present invention, a signal control unit that can control power supply to an information storage unit with a signal from an external terminal device is provided. Also, the information storage unit provided in the present invention is started up by the signal control unit even in power-saving mode to enable writing of setting information.

With the improvement described above, even when the image forming apparatus is in power-saving mode, the information storage unit retaining setting items of the apparatus is started up to enable writing and reading a setting item.

Another object of the present invention is to allow a time required until the information storage unit becomes in a startup state to be reported to an external terminal device.

The above object is achieved by providing the signal control unit with a function of reporting a time required until startup in response to an inquiry about a startup time of the information storage unit from the external terminal device.

With this, the external terminal device does not have to perform a polling operation of making an inquiry about whether the information storage unit is in startup state. Also, the load on the external terminal device for making an inquiry is suppressed. Furthermore, the load on the network due to exchange of inquiry packets is suppressed.

Furthermore, still another object of the present invention is to provide a predetermined external terminal with a function of reporting a change in state of each functional unit of the image forming apparatus, for example, the fact that the information storage unit becomes in a startup state.

DETAILED DESCRIPTION OF THE PREFERRED EMBODIMENTS

[Structure]

Figure 1:
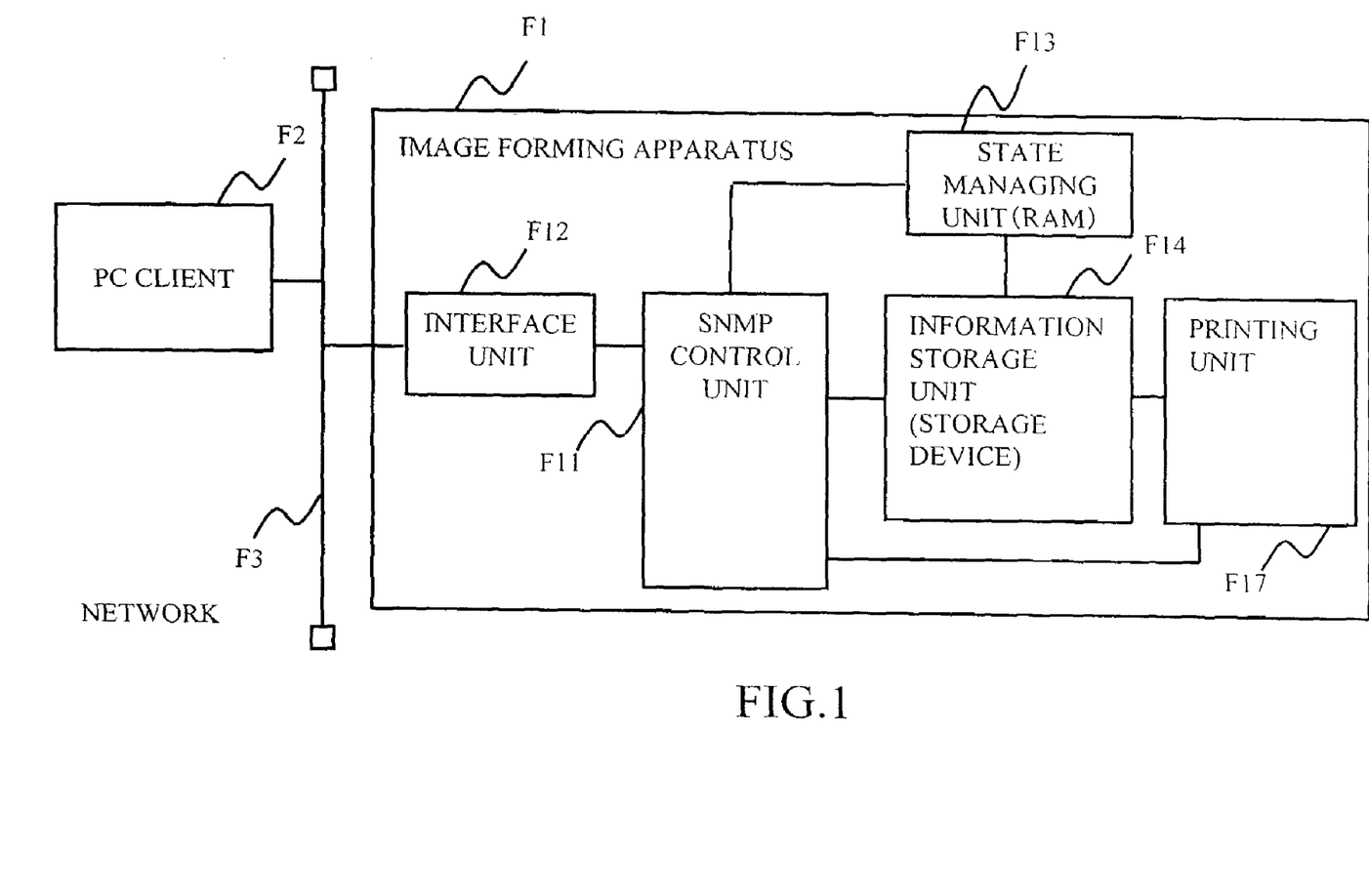
FIG. 1 is a block structure diagram of an image forming apparatus according to first and second embodiments.

FIG. 1 is a block structure diagram of an image forming apparatus according to and image forming system according to embodiments of the present invention.

As depicted in FIG. 1, an image forming apparatus F1 is connected to a PC (Personal Computer) client device F2, which is an external terminal device, through a network F3.

The image forming apparatus F1 includes an interface unit F12, a state managing unit F13, an information storage unit F14, a SNMP control unit F11, which is a signal control unit for power supply control over the information storage unit F14, and a printing unit F17.

The interface unit F12 takes charge of transmitting and receiving signals for communications with the PC client F2 through the network F3.

The SNMP (Simple Network Management Protocol) control unit F11 (signal control unit) includes a CPU and its peripheral control interface circuits.

The SNMP control unit F11 includes an information-storage-unit state checking unit that transmits and receives a signal to and from each component of the image forming apparatus F1 in response to an SNMP signal transmitted from the PC client F2 to check the state of each component of the image forming apparatus F1.

Also, the SNMP control unit F11 includes an information-storage-unit state reporting unit that reports the state of the information storage unit checked by the information-storage-unit state checking unit to the PC client F2, which is a terminal device.

Also, an information-storage-unit starting-up unit is provided that controls power supply to the information storage unit F14 of the image forming apparatus F1 according to an SNMP signal The information storage unit (storage device) F14 includes an NVRAM (Non-Volatile Memory) and a hard disk (magnetic disk). The information storage unit F14 serves as a storage device of the image forming apparatus F1, storing a program for controlling the operation of the image forming apparatus F1 and retaining image data, as well as storing setting information of the image forming apparatus F1.

The state managing unit (RAM: Random Access Memory) F13 includes a semiconductor memory. The state managing unit F13 has a function of copying and retaining setting information recorded on the information storage unit F14, such as a setting language of the printing unit F17 in the image forming apparatus F1, a specified emulation, and a panel operation language.

The printing unit F17 performs printing. In an image forming apparatus based on an electro photographic process, due to heat fixing of toner, a fixing unit, which is a component in the printing unit, particularly consumes large power. For this reason, at the time of power-saving mode, power supply to the entire printing unit is suspended to suppress power consumption of the image forming apparatus.

Modes of the image forming apparatus F1 include a power-saving mode and a normal mode. While the image forming apparatus F1 is operating in normal mode, power is supplied to all components including the printing unit F17 to perform printing.

During operation in normal mode, if no print request is present in the image forming apparatus for a predetermined period, the apparatus goes into power-saving mode.

In power-saving mode, power is supplied to the interface unit F12, the SNMP control unit F1, and the state managing unit F13 to cause these units to be in an operating state. However, power supply to the information storage unit F14 and the printing unit F17 is cut off, with the state being such that power is suppressed to maximum.

At the time of transition from the normal mode to the power-saving mode, upon instruction from the SNMP control unit F11, the setting information of the image forming apparatus F1 retained in the information storage unit F14 is copied to the state managing unit F13, and then a transition is made to power-saving mode.

In power-saving mode, upon inquiry (reading) from the PC client F2 about the setting information of the image forming apparatus F1, the information copied to the state managing unit F13 is returned.

When the setting information of the image forming apparatus is required to be changed (written) in power-saving mode, the information storage unit F14 is started up.

In a state where the information storage unit F14 is started up, power is supplied to the information storage unit to allow the setting information of the image forming apparatus F1 to be changed from the PC client F2. For example, new user registration can be performed. Also in this case, power is not supplied to the printing unit F17, with the state being such that power is suppressed second most, following the power-saving mode.

When the information storage unit F14 is started up and writing of the setting information is completed, power supply to the information storage unit may be immediately cut off. Alternatively, if a request for changing the setting information to the image forming apparatus does not occur within a predetermined time, a setting is possible in which power supply to the information storage unit is cut off after a lapse of a predetermined time. Still alternatively, the startup state may continue as it is.

The PC client F2, which is an external terminal device, includes an information-storage-unit state obtaining unit that obtains the state indicative of whether the information storage unit F14 of the image forming apparatus F1 is operable, an information-storage-unit starting-up unit for starting up the information storage unit F14, and an image-forming-apparatus setting changing unit that sets setting information of the image forming apparatus F1 in the information storage unit F14.

[Flowcharts]

Figure 2:
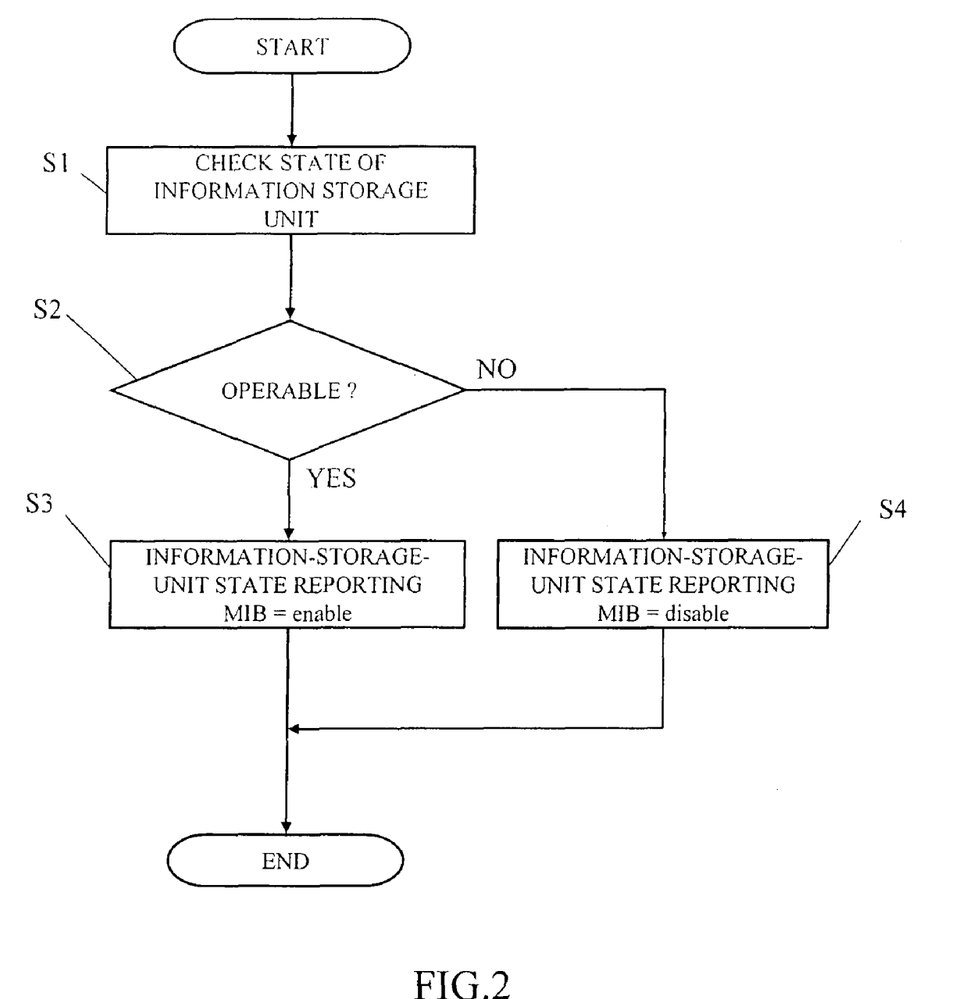
FIG. 2 is a flowchart of inquiring about the operation of an information storage unit at an image forming apparatus side according to the first embodiment.
Figure 3:
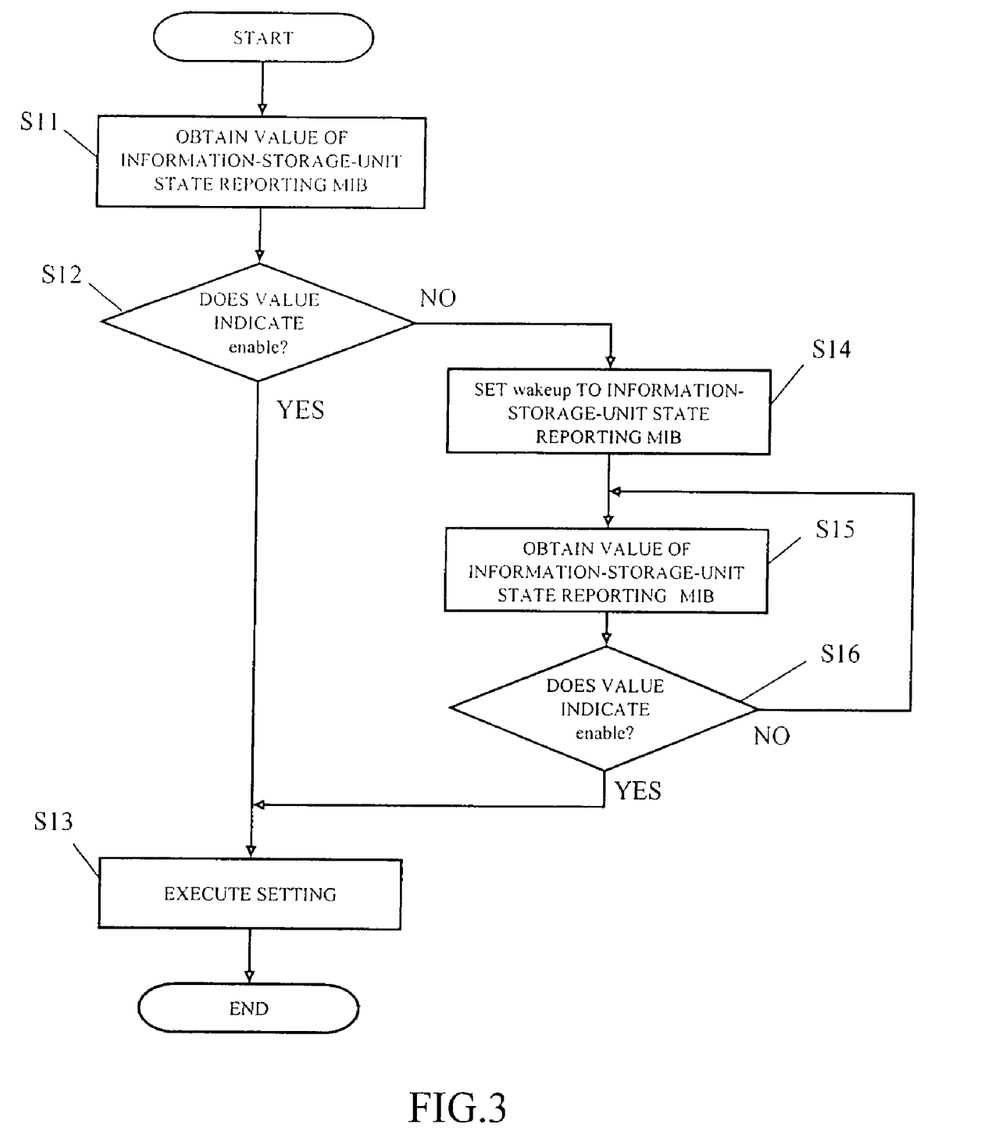
FIG. 3 is a flowchart of changing setting information in the information storage unit at a PC client side according to the first embodiment.

Using flowcharts of FIGS. 2 and 3, a flow of operation is described.

To control the operation of the information storage unit F14 in the image forming apparatus F1, an MIB (Management Information Base) is provided for the purpose of reporting the operation state of the information storage unit F14 and starting up the information storage unit F14. By setting a specific value ("wakeup") in this MIB, the information storage unit F14 can be started up (can be caused to make a transition to a writable state).

First, FIG. 2 shows a flowchart of a program for response with the state of the information storage unit F14 of the image forming apparatus F1. The program executing this flowchart operates within the image forming apparatus F1.

When an inquiry to the information-storage-unit state reporting MIB is provided to the image forming apparatus F1 (step S1), a network device checks the state of the information storage unit (step S2).

If the information storage unit F14 is in operation and in a writable state, a reply with "enable" is provided (step S3).

If power supply to the information storage unit F14 is cut off in power-saving mode and immediate writing is not allowed, a reply with "disable" is provided (step S4).

Next, using the flowchart of FIG. 3, the operation of changing the setting of the image forming apparatus F1 from the PC client F2 is described. A program for executing this flowchart operates within the PC client F2.

When the application software on the PC client F2 changes the setting of the image forming apparatus F1, the value of the MIB in the information storage unit F14 is first obtained (step S11).

It is then determined whether the value indicates "enable" (step S12). If the value indicates "enable", setting change is immediately performed (step S13).

If the determination result in step S12 indicates NO, that is, if the MIB value of the information storage unit indicates "disable", "wakeup" is set to an information-storage-unit state reporting MIB (step S14).

Then, the value of the information-storage-unit state reporting MIB is monitored (obtained at predetermined intervals) (step S15) to check the value (step S16).

If the value indicates "enable", the setting is changed (step S13). If the value indicates "disable", the procedure returns to the stage of obtaining the value of the information-storage-unit state reporting MIB (step S15) to repeat step S16 for determining the value.

The process on the PC client F2 side is thus completed.

If "wakeup" is set to the information-storage-unit state reporting MIB in step S14, the SNMP control unit F11 of the image forming apparatus F1 senses that "wakeup" has been set to the value of the information-storage-unit state reporting MIB, and supplies power to the information storage unit F14 to start up the information storage unit F14.

[Effects of the Present Embodiment]

The image forming apparatus F1 and the image forming system formed of image forming apparatus F1 and the PC client F2 according to the present embodiment include: the interface unit F12 that transmits and receives signals to and from the PC client F2 even in power-saving mode; the information storage unit F14 that is in a suspended state with power supply being cut off in power-saving mode and is supplied with power to become responsive when writing of setting information of the image forming apparatus F1 is required; and the SNMP control unit F11 that controls the state managing unit F13 and the information storage unit F14 with an SNMP signal transmitted and received by the interface unit F12. Therefore, even when the image forming apparatus F1 is in power-saving mode, "wakeup" is set to the MIB value of the information storage unit F14 with an SNMP signal from the PC client F2, thereby starting up the information storage unit F14. This makes it possible to change the setting information recorded on the information storage unit F14 of the image forming apparatus F1, such as a setting language of the image forming apparatus, a specified emulation, a panel operation language, and user account information.

Also, at the time of transition from the normal mode to the power-saving mode, the setting information of the image forming apparatus F1 stored in the information storage unit F14 is copied to and retained in the state managing unit F13. With this, even when the information storage unit F14 is not started up in power-saving mode, it is possible to respond to reading of the setting information requested from the PC client F2.

Second Embodiment

An image forming apparatus and an image forming system according to a second embodiment of the present invention are next described. The structure of the second embodiment is identical to that of the first embodiment shown in FIG. 1.

In the second embodiment, the SNMP control unit F11, which is a signal control unit of the image forming apparatus F1, includes, in addition to the functional units described in the first embodiment, a startup time reporting unit that reports a startup time required until the information storage unit F14 becomes in a startup state, in response to a request from the PC client F2, which is an external terminal device.

Also in the second embodiment, the PC client F2, which is an external terminal device, includes, in addition to the functional units described in the first embodiment, an information-storage-unit startup time obtaining unit that obtains the startup time required until the information storage unit F14 of the image forming apparatus F1 becomes in a startup state.

Other components are identical to those in the first embodiment, and therefore are not described herein.

[Flowcharts]

Figure 4:
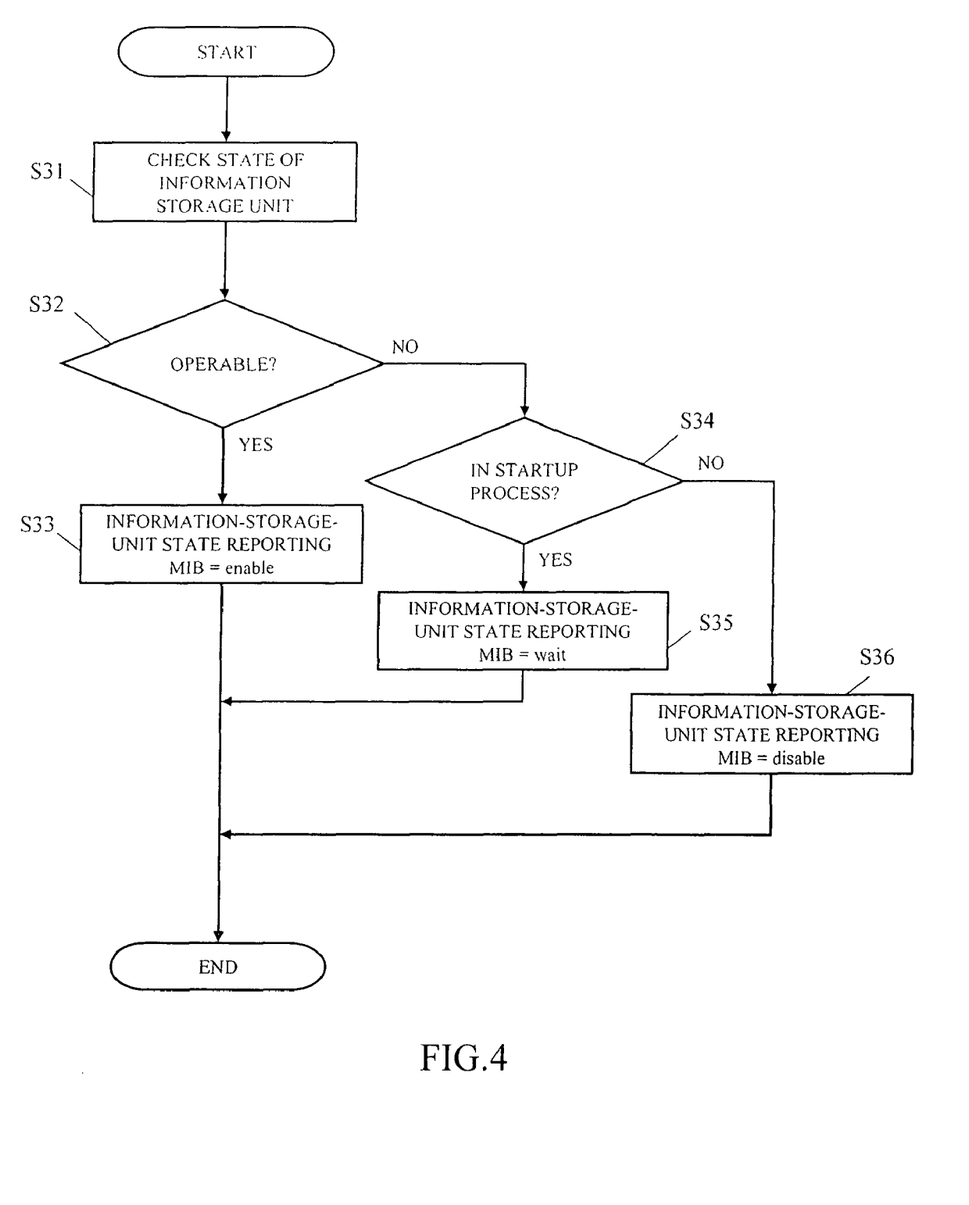
FIG. 4 is a flowchart of inquiring about an operation state of the information storage unit at an image forming apparatus side according to the second embodiment.
Figure 5:
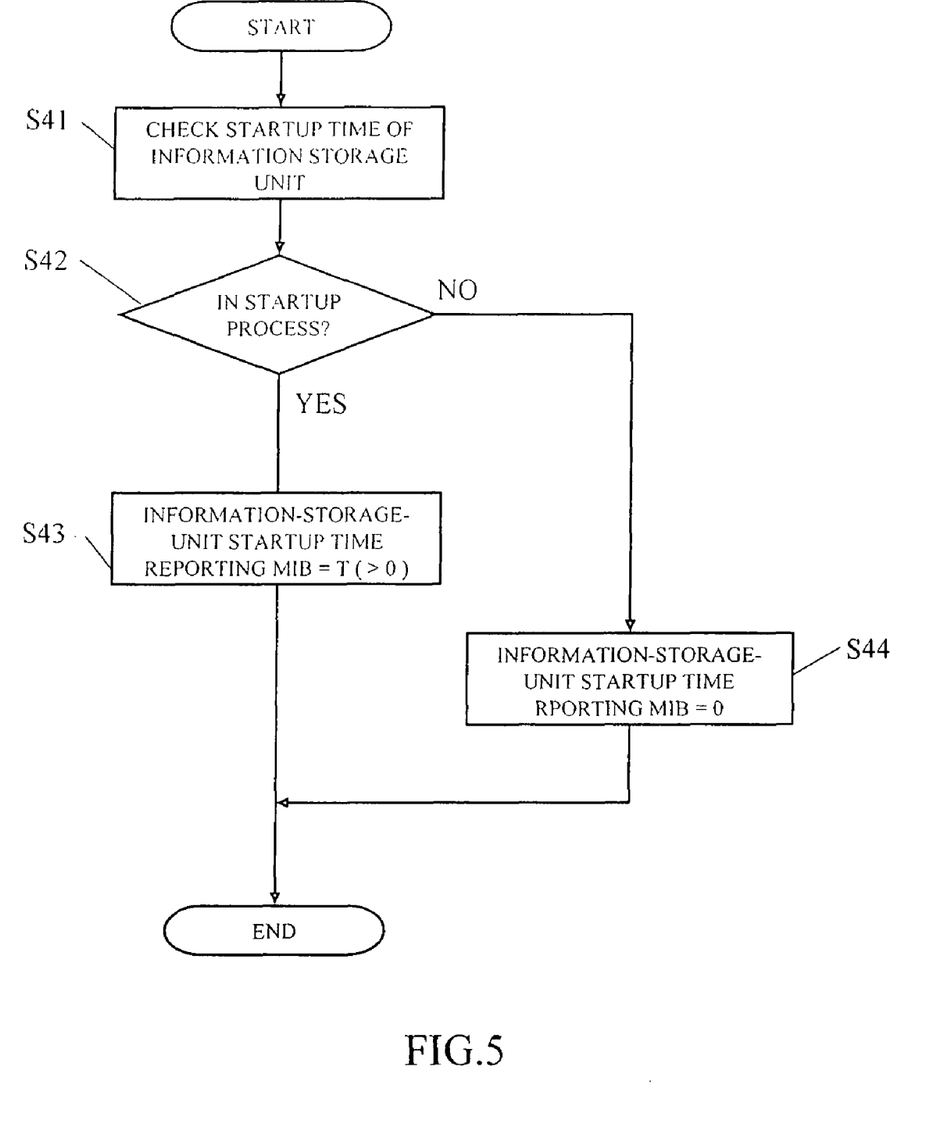
FIG. 5 is a flowchart of inquiring about a startup time of the information storage unit at the information forming apparatus side according to the second embodiment.
Figure 6:
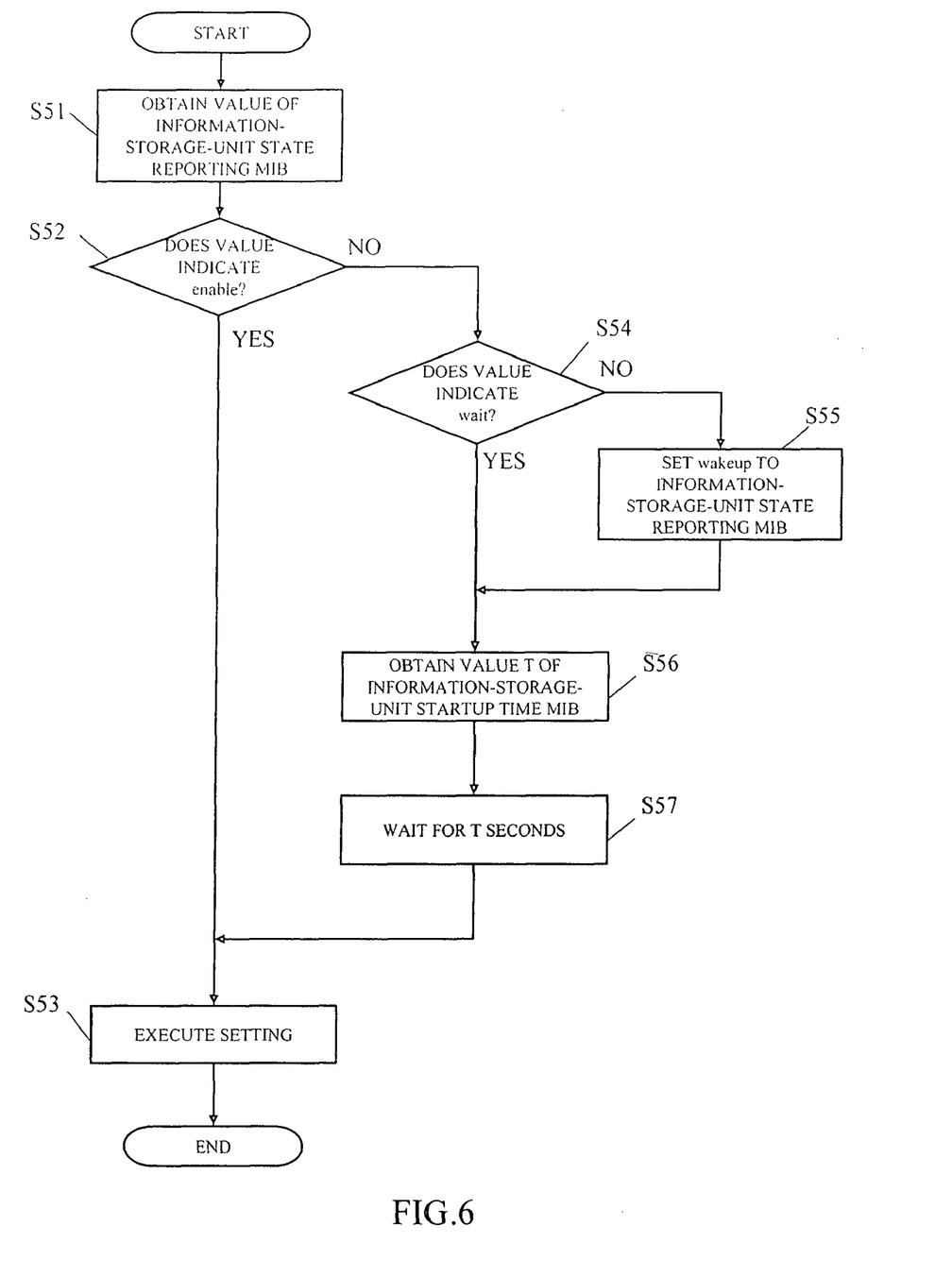
FIG. 6 is a flowchart of changing setting information in an information storage unit at a PC client side according to the second embodiment.

Using flowcharts of FIGS. 4, 5, and 6, the flow of operation is described.

To control the operation of the information storage unit F14 in the image forming apparatus F1, the following MIB are provided.

As an MIB representing the operation state of the information storage unit F14, an information-storage-unit state reporting MIB is provided to reply with an operable state ("enable"), an inoperable state ("disable"), or a state during startup process ("wait"), in response to an operation state check externally provided.

Also, by setting a specific value "wakeup" to this MIB, the information storage unit F14 can be started up (can be caused to make a transition to a writable state).

Furthermore, an information-storage-unit startup time reporting MIB is provided to reply with a time required for startup when the information storage unit F14 is in a state during startup process ("wait"). During the startup process, a reply with a time T required until startup is provided.

First, a flowchart of a program for responding with the state of the information storage unit F14 in the image forming apparatus F1 is depicted in FIG. 4. A program executing this flowchart operates within the image forming apparatus F1.

When an inquiry to the information-storage-unit state reporting MIB is provided to the image forming apparatus F1 (step S31), the image forming apparatus F1 checks the state to see whether the information storage unit is operable (step S32).

If the information storage unit F14 is in operation and in a writable state, a reply with "enable" is provided (step S33).

If the information storage unit F14 is not in an operable state in step S32, the operation goes to S34. In S34, it is checked whether the information storage unit F14 is in a startup process.

If the information storage unit F14 is in a startup process, a reply with "wait" as a value of the information-storage-unit state reporting MIB is provided (step S35).

If power supply to the information storage unit F14 is cut off in power-saving mode and not in a startup process and immediate writing is not allowed, a reply with "disable" is provided (step S36).

A series of processes regarding a reply of the information-storage-unit state reporting MIB is thus completed.

Next, with reference to the flowchart of FIG. 5, a flow of operation when a reply with an information-storage-unit startup time is provided is described. A program executing this flowchart operates within the image forming apparatus F1.

When an inquiry to the information-storage-unit startup time checking MIB is provided to the image forming apparatus F1 (step S41), the image forming apparatus checks the state to see whether the information storage unit is in a startup process (step S42).

If the information storage unit F14 is in a startup process, the operation goes to S43. If the information storage unit F14 is not in a startup process, the operation goes to S44.

If the information storage unit F14 is in a startup process, the time required for startup is checked and a reply is provided with the time T being set to the information-storage-unit startup time reporting MIB (step S43).

If the information storage unit F14 is not in a startup process, a reply s provided with the value of the information-storage-unit startup time reporting MIB being set as 0 (step S44).

A series of processes regarding a reply of the information-storage-unit startup time reporting MIB is thus completed.

Next, with reference to the flowchart FIG. 6, the operation when the setting of the image forming apparatus F1 is changed from the PC client F2 is described. A program executing this flowchart operates within the PC client F2.

When application software on the PC client F2 changes the setting of the image forming apparatus F1, the value of the MIB in the information storage unit F14 is first obtained (step S51).

It is then determined whether the value indicates "enable" (step S52). If the value indicates "enable", setting change is immediately performed (step S53).

If the determination result in step S52 indicates NO, it is determined whether the MIB value indicates "wait" (step S54). If the value indicates "wait", the operation goes to S56. Otherwise, the operation goes to S55.

If the value of the MIB indicates "wait", the MIB value T indicating the information-storage-unit startup time is obtained (step S56).

Next, in S57, the operation waits for the obtained time T seconds until the information storage unit starts up.

Then, in step S53, setting change is performed.

If the MIB value in step S54 does not indicate "wait", that is, if the MIB value of the information storage unit indicates "disable", "wakeup" is set to the information-storage-unit state reporting MIB to start up the information storage unit (step S55). Thereafter, the operation goes to S56, S57, and then S53 in a manner similar to that when the value of the information-storage-unit state reporting MIB indicates "wait".

The process on the PC client F2 side is thus completed.

If "wakeup" is set to the information-storage-unit state reporting MIB in step S55, the SNMP control unit F1 of the image forming apparatus F1 senses that "wakeup" has been set to the value of the information-storage-unit state reporting MIB, and supplies power to the information storage unit F14 to start up the information storage unit F14.

[Effects of the Second Embodiment]

The image forming apparatus F1 and the image forming system formed of the image forming apparatus F1 and the PC client F2 according to the second embodiment include: the interface unit F12 that transmits and receives signals to and from the PC client F2 even in power-saving mode; the information storage unit F14 that is in a suspended state with power supply being cut off in power-saving mode and is supplied with power to become responsive when writing of setting information of the image forming apparatus F1 is required; and the SNMP control unit F1 that controls the state managing unit F13 and the information storage unit F14 with an SNMP signal transmitted and received by the interface unit F12. Therefore, even when the image forming apparatus F1 is in power-saving mode, "wakeup" is set to the MIB value of the information storage unit F14 with an SNMP signal from the PC client F1, thereby starting up the information storage unit F14. This makes it possible to change the setting information recorded on the information storage unit F14 of the image forming apparatus F1, such as a setting language of the image forming apparatus, a specified emulation, a panel operation language, and user account information.

Also, the image forming apparatus can reply with a time required until the information storage unit F14 during a startup process enters a startup state. Therefore, an operation of checking through polling by an external terminal device whether the information storage unit F14 is in a startup state is not required. This makes it possible to simplify the process of the application software on the external terminal device. Furthermore, the number of times of obtaining MIB from the image processing apparatus is reduced, thereby making it possible to reduce the load on the network.

Still further, at the time of transition from the normal mode to the power-saving mode, the setting information of the image forming apparatus F1 stored in the information storage unit F14 is copied to and retained in the state managing unit F13. With this, even when the information storage unit F14 is not started up in power-saving mode, it is possible to respond to reading of the setting information requested from the PC client F2.

Third Embodiment

An image forming apparatus and an image forming system according to a third embodiment of the present invention are next described. The structure of the third embodiment is identical to that of the first and second embodiments shown in FIG. 1.

In the third embodiment, the SNMP control unit F11, which is a signal control unit of the image forming apparatus F1, further includes, in addition to the functional units as described in the first and second embodiments, a functional unit (a state change reporting unit) that reports the predetermined PC client F2 when the state of any of the functional units of the image forming apparatus F1 is changed (TRAP transmission). Examples of the change in state of any of the functional units include a change in a power supply mode state of the image forming apparatus, a change in an operable state of the signal control unit, and a change in a printable state of the printing unit.

In the third embodiment, the PC client F2, which is an external terminal device, further includes, in addition to the functional units as described in the first and second embodiments, a state change receiving unit that receives a report from the state change reporting unit of the image forming apparatus F1.

Other than that, the third embodiment is identical to the first embodiment, and therefore further description is omitted.

[Flowcharts]

Figure 7:
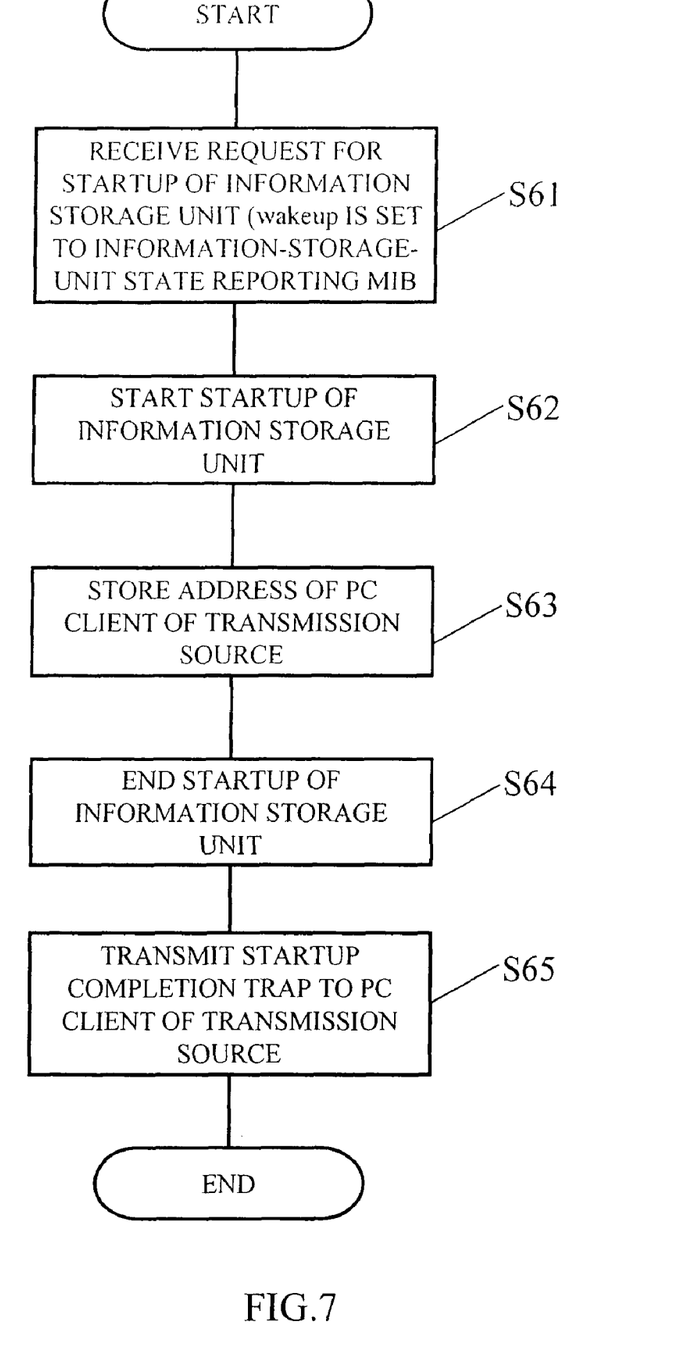
FIG. 7 is a flowchart of a startup of the information storage unit on the image forming apparatus side according to a third embodiment.
Figure 8:
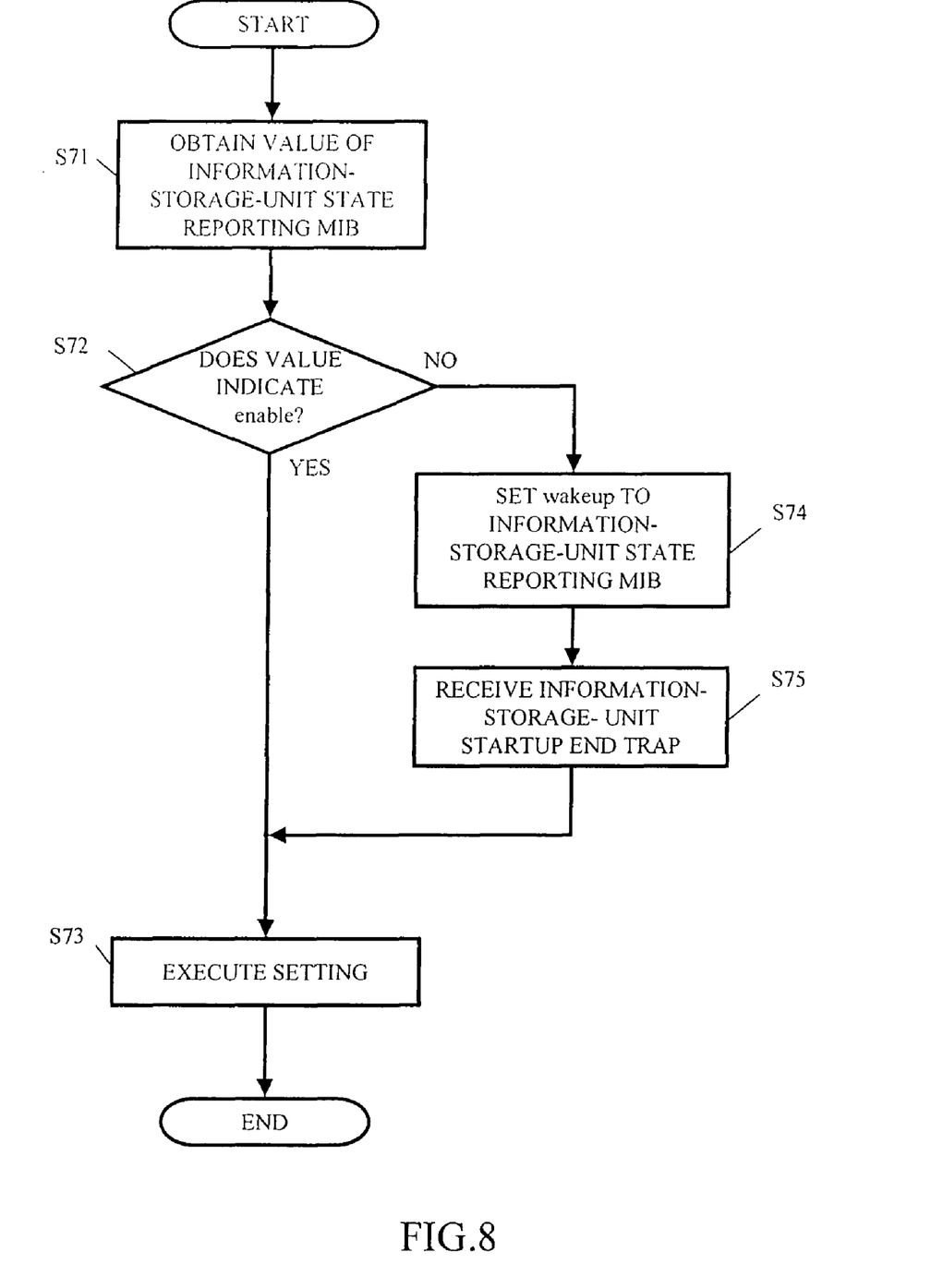
FIG. 8 is a flowchart of changing setting information with respect to the information storage unit on the PC client side according to the third embodiment.

Using flowcharts of FIGS. 4, 7, and 8, a flow of operation is described.

To control the operation of the information storage unit F14 in the image forming apparatus F1, an MIB (Management Information Base) is used for the purpose of reporting the operation state of the information storage unit F14 and starting up the information storage unit F14. By setting a specific value ("wakeup") in this MIB, the information storage unit F14 can be started up (can be caused to make a transition to a writable state).

Since the flowchart of a series of processes regarding replying to the information-storage-unit state reporting MIB by the information storage unit F14 of the image forming apparatus F1 is identical to that in the description of FIG. 4 according to the second embodiment, and therefore is not described herein.

FIG. 7 shows a flowchart of a program for receiving a startup request for the information storage unit F14 from the PC client F2 and then reporting the PC client F2 that startup has been completed. The program executing this flowchart operates within the image forming apparatus F1.

When the image forming apparatus F1 receives a request for startup of the information storage unit F14 from the PC client F2 ("wakeup" is set to the information-storage-unit state reporting MIB) (step S61), the image forming apparatus F1 starts the startup of the information storage unit F14 (step S62).

Also, the address of the PC client F2 transmitting the startup request is stored in the state managing unit (RAM) F13 (step S63).

Then, when the startup of the information storage unit F14 is completed (step S64), TRAP transmission is performed so as to report the completion of startup to the stored address of the PC client F2 (step S65: the state change reporting unit).

The process on the image forming apparatus F1 side is thus completed.

Next, the operation of changing the setting of the image forming apparatus F1 from the PC client F2 is described by using the flowchart of FIG. 8. A program executing this flowchart operates within the PC client F2.

When application software on the PC client F2 changes the setting of the image forming apparatus F1, the value of the information-storage-unit state reporting MIB of the information storage unit F14 is first obtained (step S71).

It is determined whether the value indicates "enable" (step S72). If the value indicates "enable", the setting is instantly changed (step S73).

If the determination result in step S22 is NO, "wakeup" is set to an information-storage-unit state reporting MIB (step S74).

Then, when an information-storage-unit startup complete TRAP is received from the image forming apparatus F1 (step S75), the setting is changed (step S73).

The process on the PC client F2 side is thus completed.

If "wakeup" is set to the information-storage-unit state reporting MIB in step S74, the SNMP control unit F11 of the image forming apparatus F1 senses that "wakeup" has been set to the value of the information-storage-unit state reporting MIB, and supplies power to the information storage unit F14 to start up the information storage unit F14.

[Effects of the Third Embodiment]

The image forming apparatus F1 and the image forming system formed of the image forming apparatus F1 and the PC client F2: the interface unit F12 that transmits and receives signals to and from the PC client F2 even in power-saving mode; the information storage unit F14 that is in a suspended state with power supply being cut off in power-saving mode and is supplied with power to become responsive when writing of setting information of the image forming apparatus F1 is required; and the SNMP control unit F11 that controls the state managing unit F13 and the information storage unit F14 with an SNMP signal transmitted and received by the interface unit F12. Therefore, even when the image forming apparatus F1 is in power-saving mode, "wakeup" is set to the MIB value of the information storage unit F14 with an SNMP signal from the PC client F2, thereby starting up the information storage unit F14. This makes it possible to change the setting information recorded on the information storage unit F14 of the image forming apparatus F1, such as a setting language of the image forming apparatus, a specified emulation, a panel operation language, and user account information.

Also, when the process of starting up the image storage unit F14 is completed, the completion of the startup process can be reported to the PC client F2. Therefore, an operation of checking through polling by an external terminal device whether the information storage unit F14 is in a startup state is not required. This makes it possible to simplify the process of the application software on the external terminal device. Furthermore, the number of times of obtaining MIB from the image processing apparatus is reduced, thereby making it possible to reduce the load on the network.

Still further, at the time of transition from the normal mode to the power-saving mode, the setting information of the image forming apparatus F1 stored in the information storage unit F14 is copied to and retained in the state managing unit F13. With this, even when the information storage unit F14 is not started up in power-saving mode, it is possible to respond to reading of the setting information requested from the PC client F2.

[Others]

In the flowcharts, reporting when the startup of the information storage unit is completed is described. Also, reporting can be made when the information storage unit enters a sleep state, when the power mode of the image forming apparatus is changed, or when the printable state of the printing unit is changed.

Also, when reporting the state change of a functional unit to the external terminal device, the image forming apparatus may report as such to a predetermined external terminal device specified in advance, or may broadcast as such within a network.

To broadcast the state change within a network, not the PC client setting "wakeup" makes a response as shown in FIG. 8, but the external terminal device including a state change receiving unit that receives the broadcast may make a response.

What is claimed is:

1. An image forming apparatus comprising:
   a printing unit capable of printing, the printing unit being in a suspended state with power supply being cut off in power-saving mode, and being in a wait state with power being supplied thereto in normal mode;
   an information storage unit capable of writing and retaining setting information of the printing unit at the time of power supply, the information storage unit being in a suspended state with power supply being cut off in power-saving mode; and
   a signal control unit that controls power supply to the information storage unit in power-saving mode with a signal transmitted and received by an interface unit from an external terminal device, and includes
      an information-storage-unit state checking unit that obtains, in response to a request from the external terminal device, a state indicative of whether the information storage unit becomes in an operable state; and
      an information-storage-unit state reporting unit that reports the operation state of the information storage unit obtained from the information-storage-unit state checking unit to the external terminal device.

2. The image forming apparatus according to claim 1, further comprising a state managing unit that copies and retains a value of the information storage unit and is capable of responding even in power-saving mode.

3. The image forming apparatus according to claim 2, wherein the signal control unit includes a startup time reporting unit that reports, in response to a request from the external terminal device, a startup time required until the information storage unit becomes in the operable state.

4. An image forming system provided with the image forming apparatus according to claim 3, the image forming system comprising an external terminal device including:
- an information-storage-unit state obtaining unit that obtains a state indicative of whether the information storage unit of the image forming apparatus is operable;
- an information-storage-unit startup unit that starts up the information storage unit;
- an information-storage-unit startup time obtaining unit that obtains a startup time required until the information storage unit of the image forming apparatus becomes in a startup state; and
- an image-forming-apparatus setting changing unit that sets setting information of the image forming apparatus in the information storage unit.

5. An image forming system provided with the image forming apparatus according to claim 2, the image forming system comprising an external terminal device including:
- an information-storage-unit state obtaining unit that obtains a state indicative of whether the information storage unit of the image forming apparatus is operable;
- an information-storage-unit startup unit that starts up the information storage unit; and
- an image-forming-apparatus setting changing unit that sets setting information of the image forming apparatus in the information storage unit.

6. The image forming apparatus according to claim 1, wherein the signal control unit includes a startup time reporting unit that reports, in response to a request from the external terminal device, a startup time required until the information storage unit becomes in the operable state.

7. An image forming system provided with the image forming apparatus according to claim 6, the image forming system comprising an external terminal device including:
- an information-storage-unit state obtaining unit that obtains a state indicative of whether the information storage unit of the image forming apparatus is operable;
- an information-storage-unit startup unit that starts up the information storage unit;
- an information-storage-unit startup time obtaining unit that obtains a startup time required until the information storage unit of the image forming apparatus becomes in a startup state; and
- an image-forming-apparatus setting changing unit that sets setting information of the image forming apparatus in the information storage unit.

8. The image forming system according to claim 7, wherein:
- a signal exchanged between the image forming apparatus and the external terminal device is based on SNMP (Simple Network Management Protocol), and
- information for reporting and controlling a power supply state and a power cutoff state of the information storage unit of the image forming apparatus is based on MIB (Management Information Base).

9. The image forming apparatus according to claim 1, wherein the signal control unit includes a state change reporting unit that reports a change of a state of each functional unit of the image forming apparatus to a predetermined external terminal device.

10. The image forming apparatus according to claim 9, wherein the change of the state of each functional unit reported by the state change reporting unit is any one of a change in a power mode state, a change in an operable state of the signal control unit, a change in a printable state of the printing unit, or any combination thereof.

11. An image forming system provided with the image forming apparatus according to claim 9, the image forming system comprising an external terminal device including:
- an information-storage-unit state obtaining unit that obtains a state indicative of whether the information storage unit of the image forming apparatus is operable;
- an information-storage-unit startup unit that starts up the information storage unit;
- an information-storage-unit startup time obtaining unit that obtains a startup time required until the information storage unit of the image forming apparatus becomes in a startup state;
- an image-forming-apparatus setting changing unit that sets setting information of the image forming apparatus in the information storage unit; and
- a state change receiving unit that receives a report from the state change reporting unit of the image forming apparatus.

12. The image forming system according to claim 11, wherein:
- a signal exchanged between the image forming apparatus and the external terminal device is based on SNMP (Simple Network Management Protocol), and information for reporting and controlling a power supply state and a power cutoff state of the information storage unit of the image forming apparatus is based on MIB (Management Information Base).

13. An image forming system provided with the image forming apparatus according to claim 1, the image forming system comprising an external terminal device including:
- an information-storage-unit state obtaining unit that obtains a state indicative of whether the information storage unit of the image forming apparatus is operable;
- an information-storage-unit startup unit that starts up the information storage unit; and
- an image-forming-apparatus setting changing unit that sets setting information of the image forming apparatus in the information storage unit.

14. The image forming system according to claim 13, wherein:
- a signal exchanged between the image forming apparatus and the external terminal device is based on SNMP (Simple Network Management Protocol), and information for reporting and controlling a power supply state and a power cutoff state of the information storage unit of the image forming apparatus is based on MIB (Management Information Base).

* * * * *